United States Patent
Richter et al.

(10) Patent No.: US 9,792,221 B2
(45) Date of Patent: Oct. 17, 2017

(54) SYSTEM AND METHOD FOR IMPROVING PERFORMANCE OF READ/WRITE OPERATIONS FROM A PERSISTENT MEMORY DEVICE

(71) Applicant: Swarm64 AS, Oslo (NO)

(72) Inventors: Thomas Richter, Berlin (DE); Eivind Liland, Berlin (DE); David Geier, Berlin (DE)

(73) Assignee: SWARM64 AS (NO)

( * ) Notice: Subject to any disclaimer, the term of this patent is extended or adjusted under 35 U.S.C. 154(b) by 263 days.

(21) Appl. No.: 14/087,816

(22) Filed: Nov. 22, 2013

(65) Prior Publication Data
US 2015/0149742 A1    May 28, 2015

(51) Int. Cl.
    G06F 12/10       (2016.01)
    G06F 12/1009     (2016.01)
    G06F 12/08       (2016.01)

(52) U.S. Cl.
    CPC .......... *G06F 12/1009* (2013.01); *G06F 12/08* (2013.01); *G06F 12/10* (2013.01); *G06F 2212/657* (2013.01)

(58) Field of Classification Search
    CPC .. G06F 12/10; G06F 12/1009; G06F 12/1027; G06F 12/1054; G06F 12/1063; G06F 12/08; G06F 12/0815; G06F 2212/657
    See application file for complete search history.

(56) References Cited

U.S. PATENT DOCUMENTS

| | | | | |
|---|---|---|---|---|
| 3,764,996 A | * | 10/1973 | Ross | G06F 12/1054 711/207 |
| 4,825,412 A | * | 4/1989 | Sager | G06F 12/1045 365/189.06 |
| 5,708,790 A | * | 1/1998 | White | G06F 12/1027 711/203 |
| 6,014,724 A | * | 1/2000 | Jenett | G06F 3/0607 711/103 |

(Continued)

FOREIGN PATENT DOCUMENTS

NO    WO 2015075076 A1 * 5/2015 ......... G06F 12/1009

OTHER PUBLICATIONS

Written Opinion of the Internation Searching Authority for PCT/EP2014/075037, Nov. 19, 2014, pp. 1-4.*

(Continued)

*Primary Examiner* — Michael Krofcheck
(74) *Attorney, Agent, or Firm* — Crowe & Dunlevy; Terry L. Watt

(57) ABSTRACT

A memory unit and method are disclosed. The memory unit comprises: at least one controller interfaced with at least one corresponding persistent memory device operable to store files in accordance with a file system; and a file mapping unit operable, in response to a virtual file access request from a memory management unit of a processor, the virtual file access request having a virtual address within a virtual address space associated with one of the files identifying data to be accessed, to map the virtual address to a physical address of the data within the one of the files using pre-stored mapping information and to issue a physical access request having the physical address to access the data within the one of the files.

20 Claims, 6 Drawing Sheets

(56) References Cited

U.S. PATENT DOCUMENTS

| | | | | |
|---|---|---|---|---|
| 8,407,448 B1* | 3/2013 | Hayden | ............... | G06F 9/45533 |
| | | | | 711/162 |
| 9,158,672 B1* | 10/2015 | Zheng | ................. | G06F 12/0246 |
| 2004/0221125 A1* | 11/2004 | Ananthanarayanan | | G06F 3/0613 |
| | | | | 711/203 |
| 2013/0019067 A1* | 1/2013 | Vilayannur | ............. | G06F 12/08 |
| | | | | 711/144 |
| 2014/0281362 A1* | 9/2014 | Felch | ................. | G06F 12/0886 |
| | | | | 711/206 |

OTHER PUBLICATIONS

International Search Report and Written Opinion re co-pending international patent application No. PCT/EP2014/075037.

\* cited by examiner

|     | 0 | 1 | 2 | 3 | 4 | -------- | F |
| --- | --- | --- | --- | --- | --- | --- | --- |
| n   | $T_1$ | $T_2$ | $T_3$ | $T_4$ | ---- | -------- | ---- |
| n+1 | $T_x$ | ---- | ---- | ---- | ---- | -------- | ---- |

27

|        |   | 0 | 1 | 2 | 3 | 4 | -------- | F |
| ---    | --- | --- | --- | --- | --- | --- | --- | --- |
| DISK 0 | 1 | $A_5$ | $A_6$ | $A_7$ | $A_8$ | $C_9$ | -------- | ---- |
|        | 2 | $A_9$ | $B_1$ | $B_2$ | $B_3$ | $B_4$ | -------- | ---- |
|        | 3 | $C_{10}$ | $C_{11}$ | $C_{12}$ | X | X | -------- | ---- |
|        | 4 | X | $A_1$ | $C_1$ | $C_2$ | $C_3$ | -------- | ---- |
| DISK 1 | 5 | $C_4$ | $C_5$ | $C_6$ | $C_7$ | $C_8$ | -------- | ---- |
|        | 6 | $B_5$ | $B_6$ | $B_7$ | $B_8$ | $A_2$ | -------- | ---- |
|        | 7 | $A_3$ | $A_4$ | X | X | X | -------- | ---- |
|        | 8 | X | X | X | X | X | -------- | ---- |
|        | 9 |   |   |   |   |   |          |   |

SYSTEM AND METHOD FOR IMPROVING PERFORMANCE OF READ/WRITE OPERATIONS FROM A PERSISTENT MEMORY DEVICE

FIELD OF THE INVENTION

The present invention relates to data processing and, in particular, to a memory unit which handles data access requests from a processor to access data stored in memory.

BACKGROUND

A typical data processing apparatus may have one or more processor cores arranged to execute sequences of instructions that are applied to data values supplied to the processor cores from memory. Although various techniques exist to improve the performance of such data processing apparatus when executing instructions which processing data values stored in memory, each have their own shortcomings.

Accordingly, it is desired to provide an improved technique for accessing data values in memory.

SUMMARY

According to a first aspect, there is provided a memory unit, comprising: at least one controller operable to interface with at least one corresponding persistent memory device operable to store files in accordance with a file system; and a file mapping unit operable, in response to a virtual file access request from a memory management unit of a processor, the virtual file access request having a virtual address within a virtual address space associated with one of the files identifying data to be accessed, to map the virtual address to a physical address of the data within the one of the files using pre-stored mapping information and to issue a physical access request having the physical address to access the data within the one of the files.

The first aspect recognises that a problem with existing memories is that they have conflicting characteristics. For example, whilst Random Access Memory (RAM) is durable and is fast, its cost is high, it consumes high amounts of power and occupies a large amount of space in comparison to a persistent memory or storage device (such as a solid state drive or flash memory device) which is less durable, cheaper and occupies less space, but which is much slower than RAM. Hence, although persistent memory or storage devices are more attractive for storing very large amounts of data, accessing that data is much slower than from RAM.

The first aspect also recognises that the characteristics of such persistent memory or storage devices are typically compounded when storing the data in a file-based system, since a data access request to such a file-based system typically requires the request to call at least one software function of an operating system executed on a processor. Typically, the operating system interrogates a file allocation structure in order to identify the location of the requested data. This is compounded by the fact that the processor executing the operating system may not be a local processor but a host processor and may therefore create a delay in the communication, which further exacerbates the delay or latency incurred when making access requests to the persistent storage device. Alternatively, some host processors in combination with some operating systems are operable to map a file in a file-based system to a virtual address in memory. An access to this virtual address causes an exception to occur which results in a file allocation structure needing to be interrogated in order to identify the location of the requested data. The exception handling routine is typically implemented in software running on a host processor which introduces delays, which further exacerbates the delay or latency incurred when making access requests to the persistent storage device. Typically, storing data in a file-based system is the only practical option for very large files which could not realistically be stored using conventional memory allocation or when persistency of data, such as in the event of power failure, is required. However, the aforementioned delays make the use of such persistent storage devices extremely unattractive for processing with frequent read requests or frequent write requests, despite the beneficial characteristics of those persistent storage devices for storing very large data files persistently.

Accordingly, a memory unit is provided. The memory unit may comprise one or more controllers which interface with one or more associated persistent memory devices. The persistent memory devices may store files in accordance with a file allocation structure of a file system. The memory unit may also comprise a file mapping unit. The file mapping unit may respond to virtual file access requests. The virtual file access requests may relate to a virtual address within a virtual address space associated or allocated to one of the files within the file system. The virtual address may identify the data to be accessed. The file mapping unit may map the virtual address to a physical address of the data within the file using pre-stored mapping information. The file mapping unit may issue the physical access request having the physical address in order to access the data within the files. In this way, rather than needing to call at least one software function or initiate an exception handling routine in order to interrogate the file allocation structure of the file system in response to each data access request, instead, the memory unit may utilise the pre-stored mapping information in order to translate, map or convert the virtual address into a physical address without needing to call a software function or activate an exception handling routine. This considerably speeds the access requests, which makes the use of a persistent storage device for the mapping of files stored on this device into a virtual memory space more attractive.

In one embodiment, the processing logic comprises at least one of a processor and a memory management unit of a processor. It will be appreciated that where the processor comprises a coherent vector threaded (CVT) or similar highly-threaded processor, any threads which are waiting for the data access can wait and cease to be scheduled, with other threads being scheduled instead whilst the requested data is accessed.

In one embodiment, the mapping information associates virtual addresses with physical addresses for at least parts of a subset of the files, the subset of files being those which are indicated as being accessible by a program operable to generate the virtual access request. Accordingly, mapping information may be provided for that subset of files which are indicated as being required to be accessed by a program which is executable to generate the virtual access requests. It will be appreciated that subsets of files may need to be mapped where the files are very large and are too big to be allocated in a limited virtual address space or stored by memory. It will be appreciated that mapping a subset of files or part of a file may also improve performance, such as the efficiency of a data cache by increasing the cache hit rate. The mapping of information may relate or map the virtual addresses used by the processing logic with the physical addresses of the data within the persistent memory device.

In one embodiment, the file mapping unit is operable to receive the mapping information from a host processor. It will be appreciated that the mapping information may be provided by any suitable processing logic such as, for example, a host processor or the processing logic.

In one embodiment, the mapping information is pre-stored prior to the virtual access request being received. Accordingly, rather than interrogating the file allocation structure in response to each access request, instead the mapping information may be generated and stored by the memory unit prior to the virtual access request being received. It will be appreciated that this significantly improves the speed of determining the physical address.

In one embodiment, the file mapping unit is operable to map the virtual address to the physical address by utilising selected bits of the virtual address to generate the physical address in accordance with a mapping function. Accordingly, the mapping information may provide a mapping function which indicates which bits, portions or fields of the virtual address should be utilised or manipulated in order to generate a physical address.

In one embodiment, the mapping function performs at least one of a selection, a manipulation and a logical operation on the virtual address to generate the physical address. Accordingly, the physical address may be determined solely from the virtual address provided to the memory unit.

In one embodiment, the virtual address space is derived to include, within the selected bits of the virtual addresses, the physical addresses for at least parts of a subset of the files which are indicated as being accessible by a program operable to generate the virtual access request. Accordingly, particular bits within the virtual address may be extracted to provide the physical address.

In one embodiment, the file mapping unit is operable to determine, from pre-stored size information associated with the virtual mapping space, an amount of data which includes the data of the physical access request. Accordingly, an indication of the amount of data to be accessed in response to the access request may be provided.

In one embodiment, the at least one controller is operable to access the amount of data from a corresponding persistent memory device in response to the physical access request.

In one embodiment, the memory unit comprises a physical address cache (i.e. a physically tagged cache) operable to store the amount of data. The physical address cache caches data according to or using its physical address and may store data using at least a portion of the physical address.

In one embodiment, a size of a cache line of the physical address cache exceeds the amount of data. Accordingly, an amount of data which is less than a complete cache line may be accessed and stored in the physical address cache. It will be appreciated that this can speed up the access of data from the persistent storage device.

In one embodiment, the size of a cache line of the physical address cache is one of a plurality of sizes depending on pre-stored size information associated with the virtual address space of the virtual access request. Accordingly, the memory unit may be operable to operate on different cache line sizes for the physical access requests corresponding to virtual access requests in virtual address spaces associated with different pre-stored size information. It will be appreciated that this can speed up the access of data from the persistent storage device.

In one embodiment, a tag field of each cache line is associated with the physical address.

In one embodiment, when the access request is a read request, the file mapping unit is operable to provide the data identified by the physical address associated with the physical access request in response to the virtual access request. Accordingly, the file mapping unit may provide the data in response to the virtual access request.

In one embodiment, when the access request is a write request, the file mapping unit is operable to provide data identified by the virtual address associated with the virtual access request mapped to the physical address associated with the physical access request. Accordingly, the file mapping unit may provide the data associated with the virtual address to be stored at an indicated physical address.

In one embodiment, when the access request is the write request, the file mapping unit is operable to identify modified data within the data. The modified data may be indicated using, for example, modified bits provided with the access request.

In one embodiment, the memory unit comprises a virtual address cache (i.e. a virtually tagged cache) operable to store the data provided by the file mapping unit remapped to the virtual address associated with the virtual access request. Accordingly, the virtual address cache caches data according to or using its virtual address mapping and may store data associated with the virtual address.

In one embodiment, a size of a cache line of the virtual address cache exceeds the amount of data.

In one embodiment, the size of a cache line of the virtual address cache is one of a plurality of sizes depending on pre-stored size information associated with the virtual address space of the virtual access request.

In one embodiment, a tag field of each cache line is associated with the virtual address.

In one embodiment, the file mapping unit is operable to receive host access requests from a host processor to access data identified by an address which is associated with the at least parts of a subset of the files and to determine an access type associated with the virtual access requests and the host access requests. Accordingly, the memory unit may receive access requests from more than one processor and may determine the type of access request made by those processors in order to determine how to handle them.

In one embodiment, the host access requests comprises one of host virtual access requests to access data identified by a virtual address and host physical access requests to access data identified by a physical address. Accordingly, the host processor may make both virtual access requests and physical access requests.

In one embodiment, the file mapping unit is operable, when both the virtual access requests and the host access requests are read requests, to provide data in response to both the virtual access request and the host virtual access request. Accordingly, when the access requests are all read access requests, the memory unit may provide the requested data in response to each of those requests.

In one embodiment, the file mapping unit is operable, when the host access requests are read requests and the virtual access requests are read/write requests, to provide an indication to the host processor that data has been modified in response to the virtual access requests. In one embodiment, the file mapping unit is operable, when the host access requests are read requests and the virtual access requests are read/write requests, to provide an indication to the host processor to evict data from its cache that has been modified in response to the virtual access requests. In one embodiment, the file mapping unit is operable, when the host access requests are read requests and the virtual access requests are read/write requests, to provide an indication to the host processor of data that has been modified in response to the virtual access requests. Accordingly, when the host requests are read requests and the virtual access requests are read/write requests then the file mapping unit may provide an indication to the host processor when data that has been read by the host is modified in response to the virtual access request. Additionally or alternatively, the memory unit may provide to the host processor an indication of the data that has been modified in response to the virtual access request. Additionally or alternatively, the memory unit may provide an indication to the host processor that it should evict data from its cache that has been modified in response to the virtual access requests.

In one embodiment, the file mapping unit is operable, when the host access requests are read requests, the virtual access requests are read/write requests and the read/write requests are associated with at least part of a subset of the files identified as requiring host processor data coherency, to provide an indication to the host processor when data has been modified in response to the virtual access requests. In one embodiment, the file mapping unit is operable, when the host access requests are read requests, the virtual access requests are read/write requests and the read/write requests are associated with at least part of a subset of the files identified as requiring host processor data coherency, to provide an indication to the host processor of data when it is modified in response to the virtual access requests. In one embodiment, the file mapping unit is operable, when the host access requests are read requests, the virtual access requests are read/write requests and the read/write requests are associated with at least part of a subset of the files identified as requiring host processor data coherency, to provide an indication to the host processor of data that has been modified in response to the virtual access requests when the virtual access requests to the at least part of a subset of the files identified as requiring host processor data coherency have ceased. Accordingly, when the host access requests are read requests and the virtual access requests are read/write requests, and the read/write requests relate to data which is identified as requiring data coherency, the memory unit may provide an indication to the host processor when the data is modified in response to the virtual access requests. Additionally or alternatively, the memory unit may provide an indication of data which is modified in response to the virtual access request. Additionally or alternatively, the memory unit may provide an indication to the host processor of that data which has been modified in response to the virtual access requests when the access requests to that data have ceased to occur.

In one embodiment, the memory unit comprises a modification buffer and wherein the file mapping unit is operable, when the virtual access requests are read requests to at least part of a subset of the files and the host access requests are read/write requests, to store data modified in response to the host access requests in the modification buffer until virtual access requests to the at least part of a subset of the files have ceased. Accordingly, a modification buffer may be provided and when the virtual access requests are read requests and the host access requests are read/write requests, the modification buffer may store data which is modified in response to the host access requests until the virtual access requests have ceased to occur. This effectively freezes the state of the data from the perspective of the processing logic until the processing logic has completed processing on the at least part of a subset of the files or all the modifications made by the host processor have ceased.

In one embodiment, the file mapping unit is operable to determine whether host access requests relate to data stored by the modification buffer and, if so, to utilise the data stored by the modification buffer in response to the host access requests. Accordingly, while the processing logic retrieves the frozen data, the host is continued to be provided with modified data stored in the modification buffer.

In one embodiment, the modification buffer is operable to write out the data stored by the modification buffer when the virtual access requests to the at least part of a subset of the files have ceased. Accordingly, the modified data may be provided from the modification buffer in order to update the frozen data once the host access requests have ceased to occur.

In one embodiment, the file mapping unit is operable, when the host access requests are read/write requests and the virtual access requests are read/write requests, to consolidate data modified in response to the host access requests and the virtual access requests. Accordingly, modified data may be consolidated or combined by the file mapping unit in response to the access requests.

According to a second aspect, there is provided a method, comprising: in response to a virtual file access request from processing logic, the virtual file access request having a virtual address within a virtual address space identifying data to be accessed, the virtual address being associated with a file stored in accordance with a file system by a persistent memory device, mapping the virtual address to a physical address of the data within the one of the files using pre-stored mapping information and issuing a physical access request having the physical address to access the data within the one of the files.

In one embodiment, the processing logic comprises at least one of a processor and a memory management unit of a processor.

In one embodiment, the mapping information associates virtual addresses with physical addresses for at least parts of a subset of the files, the subset of files being those which are indicated as being accessible by a program operable to generate the virtual access request.

In one embodiment, the method comprises receiving the mapping information from a host processor.

In one embodiment, the method comprises prestoring the mapping information prior to the virtual access request being received.

In one embodiment, the step of mapping comprises mapping the virtual address to the physical address by utilising selected bits of the virtual address to generate the physical address in accordance with a mapping function.

In one embodiment, the mapping function performs at least one of a selection, manipulation and a logical operation on the virtual address to generate the physical address.

In one embodiment, the virtual address space is derived to include, within the selected bits of the virtual addresses, the physical addresses for at least parts of a subset of the files which are indicated as being accessible by a program operable to generate the virtual access request.

In one embodiment, the method comprises determining, from pre-stored size information associated with the virtual mapping space, an amount of data which includes the data of the physical access request.

In one embodiment, the method comprises accessing the amount of data from a corresponding persistent memory device in response to the physical access request.

In one embodiment, the method comprises storing the amount of data in a physical address cache (i.e. a physically tagged cache).

In one embodiment, a size of a cache line of the physical address cache exceeds the amount of data.

In one embodiment, the size of a cache line of the physical address cache is one of a plurality of sizes depending on pre-stored size information associated with the virtual address space of the virtual access request.

In one embodiment, a tag field of each cache line is associated with the physical address.

In one embodiment, when the access request is a read request, the method comprises providing the data identified by the physical address associated with the physical access request in response to the virtual access request.

In one embodiment, when the access request is a write request, the method comprises providing data identified by the virtual address associated with the virtual access request mapped to the physical address associated with the physical access request.

In one embodiment, when the access request is the write request, the method comprises identifying modified data within the data.

In one embodiment, the method comprises storing the data remapped to the virtual address associated with the virtual access request in a virtual address cache (i.e. a virtually tagged cache).

In one embodiment, a size of a cache line of the virtual address cache exceeds the amount of data.

In one embodiment, the size of a cache line of the virtual address cache is one of a plurality of sizes depending on pre-stored size information associated with the virtual address space of the virtual access request.

In one embodiment, a tag field of each cache line is associated with the virtual address.

In one embodiment, the method comprises receiving host access requests from a host processor to access data identified by an address which is associated with the at least parts of a subset of the files and determining an access type associated with the virtual access requests and the host access requests.

In one embodiment, the host access requests comprise one of host virtual access requests to access data identified by a virtual address and host physical access requests to access data identified by a physical address.

In one embodiment, the method comprises, when both the virtual access requests and the host access requests are read requests, providing data in response to both the virtual access request and the host virtual access request.

In one embodiment, the method comprises, when the host access requests are read requests and the virtual access requests are read/write requests, providing an indication to the host processor that data has been modified in response to the virtual access requests. In one embodiment, the method comprises, when the host access requests are read requests and the virtual access requests are read/write requests, providing an indication to the host processor to evict data from its cache that has been modified in response to the virtual access requests. In one embodiment, the method comprises, when the host access requests are read requests and the virtual access requests are read/write requests, providing an indication to the host processor of data that has been modified in response to the virtual access requests.

In one embodiment, the method comprises, when the host access requests are read requests, the virtual access requests are read/write requests and the read/write requests are associated with at least part of a subset of the files identified as requiring host processor data coherency, providing an indication to the host processor when data has been modified in response to the virtual access requests. In one embodiment, the method comprises, when the host access requests are read requests, the virtual access requests are read/write requests and the read/write requests are associated with at least part of a subset of the files identified as requiring host processor data coherency, providing an indication to the host processor of data when it is modified in response to the virtual access requests. In one embodiment, the method comprises, when the host access requests are read requests, the virtual access requests are read/write requests and the read/write requests are associated with at least part of a subset of the files identified as requiring host processor data coherency, providing an indication to the host processor of data that has been modified in response to the virtual access requests when the virtual access requests to the at least part of a subset of the files identified as requiring host processor data coherency have ceased.

In one embodiment, the method comprises, when the virtual access requests are read requests to at least part of a subset of the files and the host access requests are read/write requests, storing data modified in response to the host access requests in a modification buffer until virtual access requests to the at least part of a subset of the files have ceased.

In one embodiment, the method comprises determining whether host access requests relate to data stored by the modification buffer and, if so, utilising the data stored by the modification buffer in response to the host access requests.

In one embodiment, the method comprises writing out the data stored by the modification buffer when the virtual access requests to the at least part of a subset of the files have ceased.

In one embodiment, the method comprises, when the host access requests are read/write requests and the virtual access requests are read/write requests, consolidating data modified in response to the host access requests and the virtual access requests.

According to a third aspect, there is provided a computer program product operable, when executed on a computer, to perform the method steps of the second aspect.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function. In particular, where a feature comprises logic operable to provide a function, it will be appreciated that this encompasses circuitry configured to provide that function.

BRIEF DESCRIPTION OF THE DRAWINGS

Embodiments of the present invention will now be described further, with reference to the accompanying drawings, in which:

FIG. 2 illustrates schematically the arrangement of files stored within persistent storage devices;

DESCRIPTION OF THE EMBODIMENTS

Overview

Figure 1:
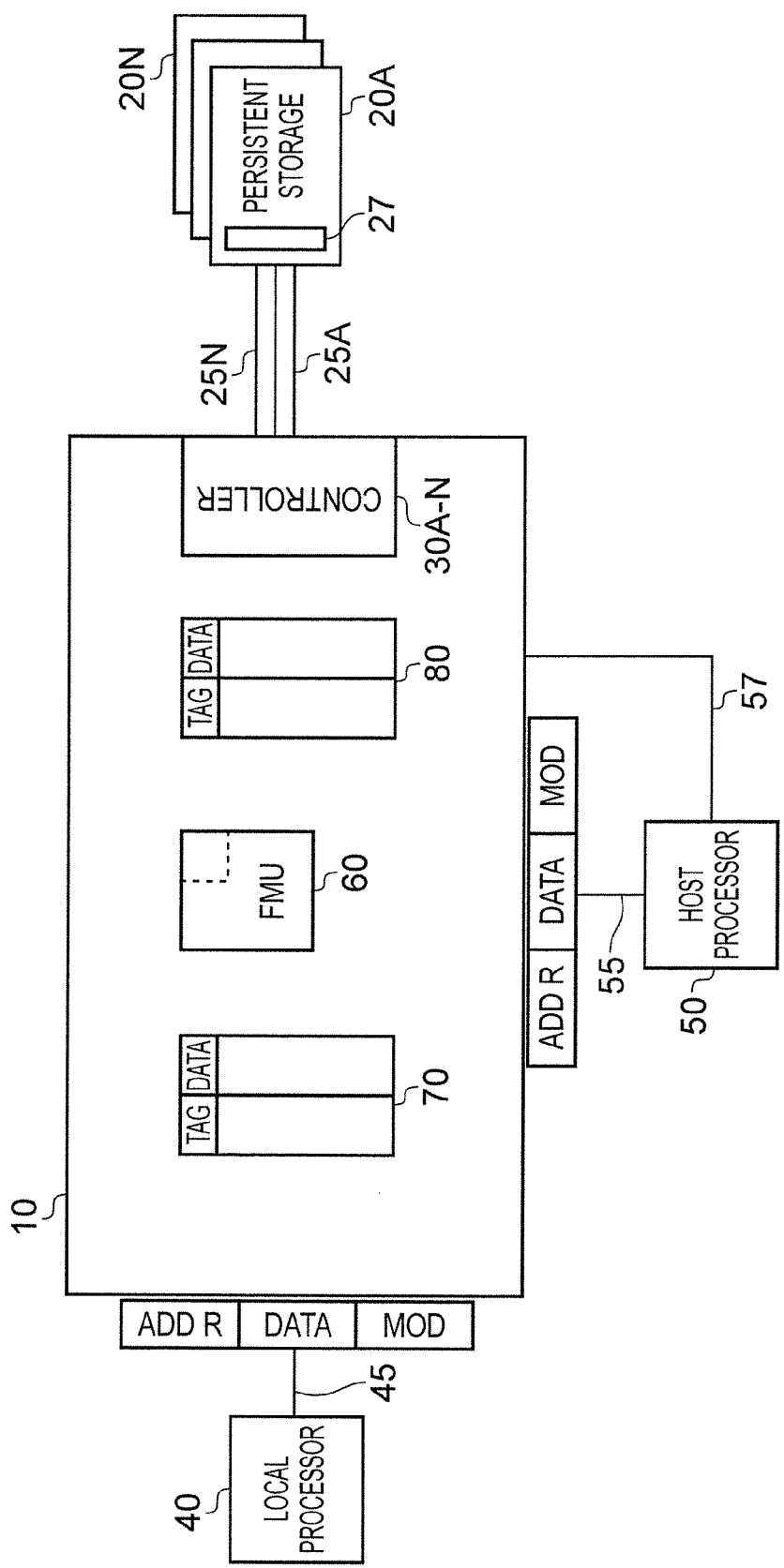
FIG. 1 illustrates a memory unit 10 according to one embodiment.

Before discussing embodiments in any more detail, first an overview will be provided. Embodiments provide a memory unit which is arranged to interface a persistent and, typically, high-latency storage device such as, for example, a static memory device (such as a solid state drive) with one or more processors. The processor executes one or more programs comprising sequences or threads of instructions. During execution of these instructions, processing occurs on data values. In order to improve processing, the instructions utilise virtual addresses for the data values in accordance with known techniques. Using virtual addresses enables the actual physical address of the data stored in a memory to be decoupled so that the same program can be executed even when the data values are stored in different physical locations at different times or for different processors.

Some processors in combination with some operating systems are operable to map a file in a file-based system on a persistent memory device to a virtual address in memory. An access to this virtual address typically causes an exception to occur which results in a file allocation structure needing to be interrogated in order to identify the location of the requested data. When a processor connected to the memory unit identifies that a file access request is associated with data stored by the persistent storage device, rather than execute a software exception handler, the file access request is instead sent to the memory unit. The memory unit then receives file access requests from the processor which are associated with these virtual addresses.

The memory unit uses information previously stored within the memory unit to translate or convert the virtual address into a physical address of a file stored within the persistent storage device. Using this pre-stored information avoids the need for software processing to be invoked in order to examine a file allocation structure to determine a physical address within the persistent storage device onto which the virtual address for the data within a file to be accessed maps. It will be appreciated that invoking such software functionality causes significant delays when accessing a file within the storage device, particularly if the data access request is generated by a co-processor which typically requires the host processor to invoke an exception handler, which exacerbates the latency or delay of accesses which is already a characteristic of such persistent storage devices. By using pre-stored information, the memory unit is able to determine the physical address itself more rapidly than would otherwise be possible, which speeds up accesses to such persistent storage devices. This is particularly beneficial when a highly threaded processor, such as a CVT processor, generates large numbers of file accesses in parallel, each of which would typically require the software process to be invoked in order to determine a physical address of the part of the file being accessed within the persistent storage device.

The pre-stored information may map between virtual and physical addresses in a variety of different ways. For example, some form of look-up table may be provided mapping the virtual and physical addresses, bits of the addresses may be manipulated to map between virtual and physical addresses, or a combination of these two may be utilised. This enables the mapping between a physical and virtual address to be performed by the memory unit without needing to obtain any further information or to access the persistent storage device to access the file allocation structure. This pre-stored information typically relates to just those files, or portions or parts of files, which are indicated as being accessible during execution of the program and a host processor is typically very efficient at interrogating the file allocation structure once to determine the mapping.

In order to further improve the performance of the memory unit, one or more caches may be provided into which data associated with the accesses may be written and/or read. This helps to reduce the number of accesses to the persistent storage device. Typically, the persistent storage device stores files which are too large to be cached by the memory unit or stored in memory local to the processor.

Memory Unit Architecture

FIG. 1 illustrates a memory unit 10 according to one embodiment. Coupled with the memory unit 10 is a set of one or more persistent storage devices 20A-20N. In this example, the set of persistent storage devices 20A-20N is solid-state drives (such as single cell or multi cell NAND flash memory). However, it will be appreciated that other persistent storage devices such as electrical, magnetic, optical, chemical or biological storage devices may also be used, as may network storage devices which can also exhibit a high access latency compared to conventional Random Access Memory (RAM). Typically, each persistent storage device 20A-20N is coupled with an associated controller 30A-30N via a corresponding bus 25A-25N. Each controller 30A-30N operates to retrieve one or more blocks or clusters typically between 512 bytes and 8 kiloBytes (kB) of data from the associated persistent storage device 20A-20N over the corresponding bus 25A-25N. In this embodiment, the blocks have a size of 4 KB of data. The persistent storage devices 20A-20N typically also incorporate a controller (not shown) to interface the persistent storage to the bus 25A-25N.

A local processor 40, such as a coherent vector threaded (CVT) processor or other highly-threaded processor, is coupled with the memory unit 10 via a bus 45. In this embodiment, the bus 45 comprises a 64 byte bus supporting transmission of an address, data and a data modified mask (which identifies which data has been modified by the local processor 40; typically due to that data being marked as dirty in memory local to the local processor 40).

Typically, a host processor 50 also couples with the memory unit 10 via a bus 55. The bus 55 also supports transmission of address, data and a data modification mask. The host processor 50 and the local processor 40 are operable to make data access requests via the buses 55, 45 respectively to access data stored by the persistent storage devices 20A-20N.

In an embodiment where the host processor 50 and the local processor 40 are co-located, the buses 55 and 45 may be combined into a single bus.

The memory unit 10 comprises a file mapping unit 60 which operates to control data accesses received from the local processor 40 and/or the host processor 50. In particular, the file mapping unit 60 translates access requests associated with virtual addresses received from either the local processor 40 or the host processor 50 into access requests associated with physical addresses for accessing files stored in file storage on the persistent storage devices 20A-20N, as will be explained in more detail below.

In order to improve the performance of the memory unit 10, an optional virtual address cache 70 and an optional physical address cache 80 may be provided. In this example, the virtual address cache 70 is configured as a multi-way set associative cache storing in each entry a 4 kB cache line of data and a 9 bit TAG. In other words, the virtual address cache 70 is a virtually tagged cache that stores data using its virtual address. In this example, the physical address cache 80 is configured as a multi-way set associative cache storing in each entry a 4 kB cache line of data and a 16 bit TAG. In other words, the physical address cache 80 is a physically tagged cache that stores data using its physical address. It will be appreciated that the size and configuration of both the virtual address cache 70 and the physical address cache 80 may be selected to suit the size of the data requests made by the local processor 40 and/or the host processor 50 and/or the size of the data returned by the persistent storage device 20A-20N.

In this example, host processor 50 is coupled with the file mapping unit 60 via a bus 57 over which the pre-stored mapping information is provided, as will be explained in more detail below.

File System Structure

FIG. 2 illustrates schematically the arrangement of files stored within the persistent storage devices 20A-20N. A relatively simple example is shown for three files; files A, B and C stored across different disks of the persistent storage devices 20A-20N. The files are stored as blocks or clusters within the persistent storage devices 20A-20N. For example, a first block or cluster $A_1$ of file A is stored starting at physical address 41000 (Hex) on disk 0. The next block or cluster $A_2$ is stored starting at physical address 64000 on disk 1.

An indication of the files stored by the persistent storage devices 20A-20N, together with the starting location of the blocks or clusters forming those files, is stored in a file allocation structure 27 within the persistent storage devices 20A-20N, in accordance with known techniques. In those known techniques, when a processor attempts an access to data stored within the persistent storage devices 20A-20N, the processor interrogates the file allocation structure 27 in order to identify the physical address of the relevant file or file block or an exception occurs and software handles the interrogation of the file allocation structure 27 in order to identify the physical address of the relevant file or file block or cluster to be accessed.

Example Operation

The host processor 50 typically executes a program and part of that program seeks to utilise the highly threaded, highly parallel processing properties of the local processor 40 in order to perform data processing on one or more (typically very large) files stored by the persistent storage devices 20A-20N. For example, the files stored by the persistent storage devices 20A-20N may be very large database files, audio or video files, or the like.

In overview, the host processor 50 provides the local processor 40 with a program to be executed (typically in a highly threaded manner) and specifies the files or portions of files to be accessed during such processing by the local processor 40. The host processor 50 executes software to determine, using the file allocation structure 27, the physical addresses of the clusters or blocks of the files within the persistent storage devices 20A-20N which are identified by the host processor 50 as being required to be accessed by the local processor 40 during execution of the program provided to the local processor 40 by the host processor 50. The host processor 50 also allocates virtual memory addresses to these files or file portions or parts to be utilised by the local processor 40 when executing the program. The host processor 50 provides this mapping information, which maps the virtual addresses with the physical addresses, to the file mapping unit 60.

Figure 3:
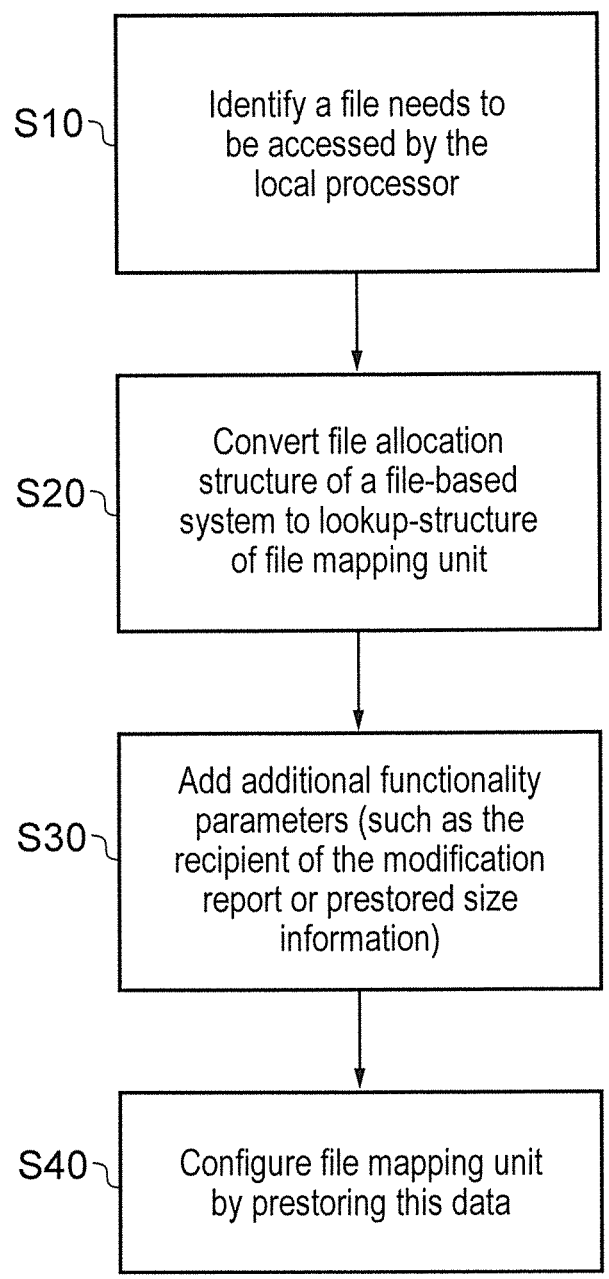
FIG. 3 illustrates the main processing steps performed in order to allocate a virtual address range in the virtual address space and to program the file mapping unit with pre-stored information.

FIG. 3 illustrates the main processing steps performed in order to allocate a virtual address range in the virtual address space and to program the file mapping unit with pre-stored information in order to enable it to map a virtual address into a physical address. At step S10, typically the host processor 50 (or even the local processor 40) identifies that a file within the persistent storage devices 20A-20N will need to be accessed by the local processor 40. This can occur before or during the execution of the program by the local processor 40.

At step S20, the file allocation structure 27 is examined and the physical addresses of the files to be accessed (or portions, parts or windows thereof) are determined and corresponding virtual address range in the virtual address space is allocated.

At step S30, it is determined whether additional functionality parameters to enhance the performance of the memory unit for memory accesses within certain address ranges are to be set. If so, then indications of this additional functionality are provided.

At step S40, the file mapping unit 60 is then configured by pre-storing this information to enable virtual-physical address translation to occur prior to such data accesses being made.

Considering the file A, the host processor 50 would determine from the file allocation structure 27 that the file A consists of nine blocks or clusters A1-A9, each with a block size of 4 kB; that cluster A1 starts at physical address 41000, cluster A2 starts at 64000, clusters A3 and A4 start at 70000, clusters A5-A8 start at 10000 and cluster A9 starts at 20000. Accordingly, the host processor 50 will allocate the virtual address range from 0000 to 8FFF inside the virtual address space for file A and will store mapping information which maps the virtual address range to the physical address range.

Mapping Information—Lookup Table

One possible embodiment of that mapping information, where a direct mapping between virtual and physical addresses, is provided is shown in Table 1 below.

TABLE 1

| Virtual Address Range | Physical Address Range |
|---|---|
| 0000-0FFF | 41000-41FFF |
| 1000-1FFF | 64000-64FFF |
| 2000-3FFF | 70000-71FFF |
| 4000-7FFF | 10000-13FFF |
| 8000-8FFF | 20000-20FFF |

Other files stored by the persistent memory devices 20A-20N, which are to be accessed by the program being executed by the local processor 40, may have virtual addresses allocated and mapping information stored in a similar manner. It will be appreciated that should the virtual address space not be sufficient to include all of the files, then portions, parts or windows of these files may be allocated virtual addresses and mapping information provided for those portions, parts or windows of files.

Mapping Information—Address Bit Manipulation

Figure 4:
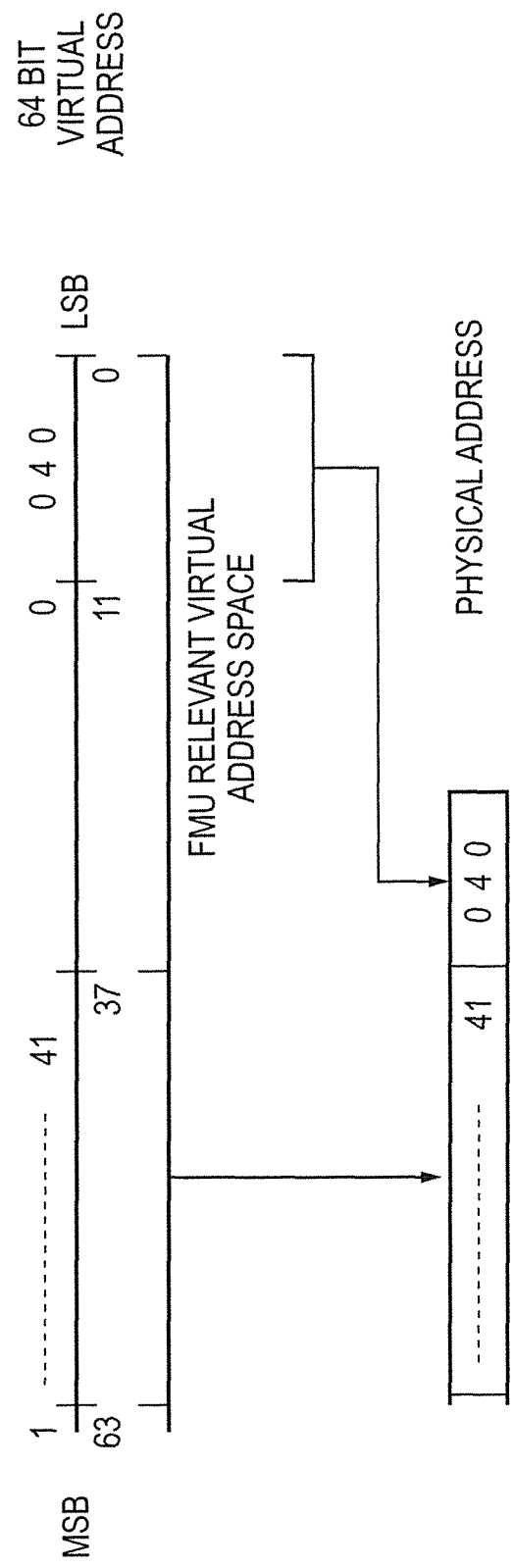
FIG. 4 illustrates an arrangement where one of the processors encodes both the virtual address and the physical address together.

FIG. 4 illustrates an alternative arrangement where the host processor 50 encodes both the virtual address and the physical address together, and the mapping information indicates how to re-order or manipulate the bits of the virtual address in order to extract the physical address. For example, FIG. 3 illustrates an example 64 bit address which encodes both the virtual address and the physical address. Bits 0 to 37 indicate the virtual address space allocation for use by the file mapping unit. Bits 38 to 62 indicate a portion of the physical address, whilst bit 63 indicates that the address relates to data stored in the persistent memory devices 20A-20N.

As can be seen in FIG. 4, an access request is generated and, because bit 63 is set, the access request is sent to the memory unit 10. The file mapping unit 60 receives the access request and bits 0 to 37 are extracted to indicate the virtual address of the access request. Bits 38 to 62 are extracted and concatenated with bits 0 to 11 in order to obtain the physical address. In one embodiment, the local processor 40 manipulates the virtual address bits 38 to 62 so that the concatenated address equals the desired physical address. In another embodiment, the file mapping unit 60 or the host processor 50 executes this manipulation.

Mapping Information—Hybrid Approach

Figure 5:
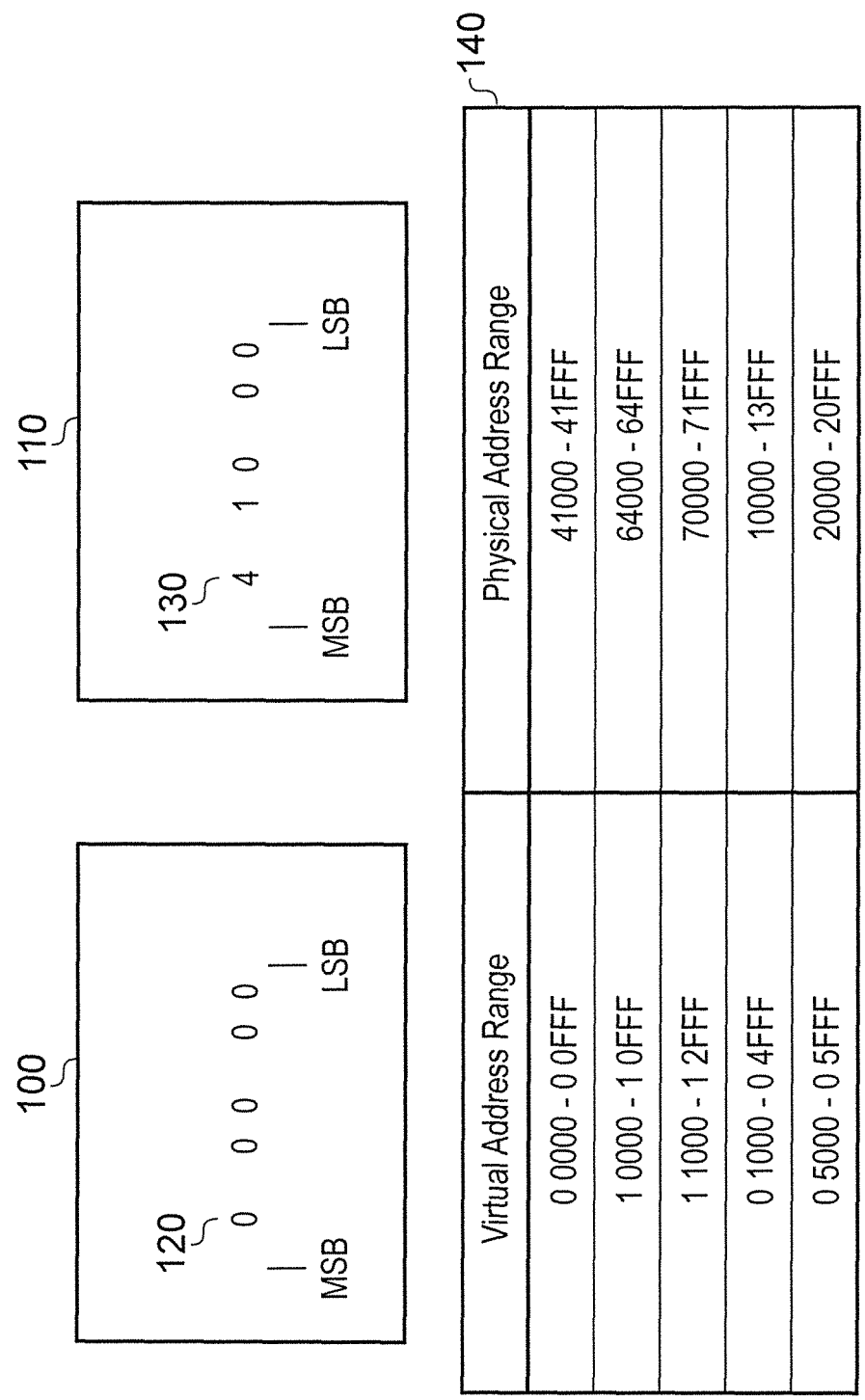
FIG. 5 illustrates a hybrid approach where both manipulation of the address and use of a look-up table occur in order to map a virtual address onto a physical address.

FIG. 5 illustrates a hybrid approach where both manipulation of the address and use of a look-up table occur in order to map a virtual address onto a physical address. In the embodiment illustrated in FIG. 5, it is desirable to distinguish between a virtual address that corresponds to a physical address on the persistent storage device 20A and a virtual address that corresponds to a physical address on the persistent storage device 20B.

An example virtual address 100 of 0000 (in Hex) and the corresponding physical address 110 of 41000 (in Hex) are provided. To distinguish which of the persistent storage devices 20A or 20B the virtual address 100 corresponds to, the first bits 120 are required to be set to 0 in the case of persistent storage device 20A or to be set to 1 in the case of persistent storage device 20B. In the physical address 110 the first bits 130 refer to persistent storage device 20A if they are below or equal 4 and to persistent storage device 20B if they are 5 or greater, as shown in FIG. 2. Accordingly, if a virtual access request with a virtual address 100 is received by the memory unit 10 and the first bits 120 of this virtual address is 1, the memory unit has thereby already received the information that the virtual access request corresponds to data on persistent storage device 20B and that the first bits 130 of the physical address 110 will be 5 or greater.

In the embodiment illustrated in FIG. 5, the process step S40 mentioned above is adjusted so that it allocates not one virtual address range 0000-8FFF for file A inside the virtual address space but three virtual address ranges 00000-00FFF, 10000-12FFF and 01000-05FFF inside the virtual address space as shown in table 140, each corresponding to a part or window of file A.

File Mapping Unit Operation

Figure 6:
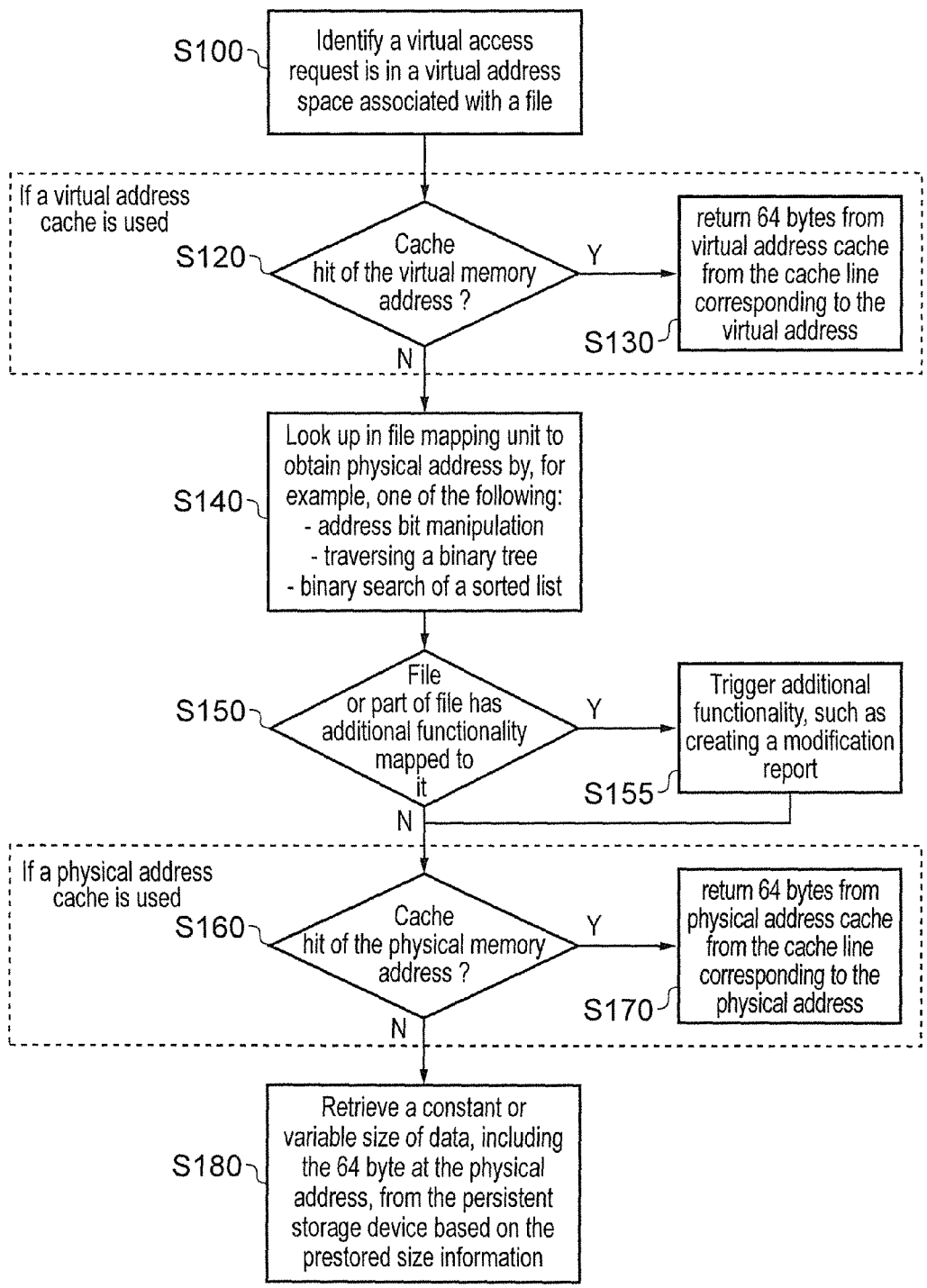
FIG. 6 illustrates an example operation of the memory unit in response to data access requests.

FIG. 6 illustrates an example operation of the memory unit 10 in response to data access requests. In this example, the data access requests relate to a read request for 64 bytes of data within the persistent storage devices 20A-20N made by the local processor 40.

At Step S100, the local processor 40 (or its memory management unit (not shown)) identifies that the access request is to a virtual address associated with the persistent storage device 20A-20N. Accordingly, the access request is transferred over the bus 45 to the memory unit 10.

If a virtual address cache 70 is provided, then processing proceeds to step S120 where it is determined whether the access request to the virtual address results in a hit within the virtual address cache 70. If a hit occurs, then, at step S130, 64 bytes of data are returned from the appropriate cache line.

If it is determined at step S120 that a cache miss occurs, then the virtual address cache 70 attempts to retrieve a 4 kB cache line containing the 64 bytes of data. Accordingly, at step S140, the access request containing the virtual address is received from the virtual address cache 70 or over the bus 45 by the file mapping unit 60. The file mapping unit 60 maps the virtual address to a physical address using the mapping information in accordance with the techniques mentioned above. For example, an access request to virtual address 0040 will be mapped to a physical address of 41040 following the examples mentioned above.

At step S150, it is determined whether the file or memory address range has additional functionality associated with it (such as whether the address range is to support concurrent accesses from different processors). If there is no additional functionality associated, then processing proceeds to step S160.

If a physical address cache 80 is provided, then at step S160 it is determined whether a cache hit has occurred for the physical address specified. If a cache hit does occur, the 64 bytes requested are returned to the virtual address cache 70 which, in turn, responds to the virtual access request or directly to the bus 45.

If a cache miss occurs then, at step S180, the physical address cache 80 or the file mapping unit 60 initiates an access request to the appropriate controller 30A-30N to retrieve an amount of data from the corresponding persistent storage device 20A-20N which includes the requested 64 bytes of data. This amount of data can be one of a constant amount of data and a variable amount of data depending on pre-stored size information. The constant amount of data accessed may, for example, be equal to the block or cluster size of the persistent storage device and its file allocation structure 27, typically 4 kB, or the cache line size of the virtual address cache 70 or the physical address cache 80. Alternatively, a variable amount of data is accessed depending on pre-stored size information. This pre-stored size information is typically stored at step S30 and provides a mapping between a virtual access request and the amount of data that is accessed and, typically, if or how this data is stored in a cache line of the virtual address cache 70 or physical address cache 80. Accordingly, when a virtual access request within a first virtual memory space is configured by the pre-stored size information to retrieve 512 bytes and a virtual access request within a second virtual memory space is configured by the pre-stored size information to retrieve 8 kB, then the virtual access requests to the first virtual memory space will, at step S180, access 512 bytes on the persistent storage device 20A-20N, whereas 8 kB are accessed on the persistent storage device 20A-20N if the virtual access request is to the second virtual memory space. It will be appreciated that this can accelerate the operation of the memory unit 10 as the characteristics of a 512 byte data access and a 8 kB data access, such as transfer time over the bus 25A-25N, differ.

In one embodiment, the virtual address cache 70 is divided into two or more regions that each correspond to one or more virtual address spaces. The cache line size of each region is set to a size defined by the pre-stored size information for this region. Each virtual access request accesses an amount of data that matches both the pre-stored size information and the cache line size of the corresponding region in the virtual address cache 70.

It will be appreciated that when the local processor 40 is a CVT processor, the program thread waiting for the requested data may be prevented from being scheduled and other threads may be scheduled instead until the data requested is available.

Concurrent Data Accesses

Should multiple accesses be made to the same data (typically from both the local processor 40 and the host processor 50) then the memory unit 10 may operate as follows:

Host Processor Read Access—Local Processor Read Access

When both the host processor 50 and the local processor 40 perform read accesses to the same data, then each of these read accesses are served by the memory unit 10.

Host Processor Read Access—Local Processor Read/Write Access

When the host processor 50 performs read requests to data that can be written by the local processor 40, then whenever the local processor 40 changes data that has been provided to the host processor 50, a modification report is provided to the host processor 50 each time the data is changed. The modification report may indicate either the modified value of the data or just indicate that the data stored by the host processor 50 is invalid. Alternatively, the memory unit 10 may allow the local processor 40 to modify the data that has been read by the host processor 50 and send a modification report to the host processor 50 once the accesses by the local processor 40 have ceased, which requests that all the data modified by the local processor 40 and provided to the host processor 50 is invalidated. The creation or modification of such a modification report is triggered at process step S155.

Host Processor Read/Write—Local Processor Read

When the host processor 50 makes read/write accesses to data provided to the local processor 40, then no special handling may occur. Alternatively, freeze functionality may be implemented whereby a modification buffer (not shown) is provided which stores any modified data written by the host processor 50 until the modifications have ceased, after which time the cumulative modifications to the data are then written out.

Host Processor Read/Write—Local Processor Read/Write

In the event that both the host processor 50 and the local processor 40 are performing reads and writes to the same data, modification bits may be set to indicate that stored data has been modified so that the other processor may invalidate the data that has been modified or be prevented from overwriting this modified data with out-of-date cached data, known as stale data. Typically, the expected behaviour in a file-based system is that only data modified by the host processor 50, and by not stale data from the host processor's caches, will be written. Accordingly, the local processor 40 is typically expected to write only data modified by the local processor 40 and not stale data from the local processor's caches.

If a modification bit of bus 45, and bus 55 respectively, is set, the corresponding value will be written. If this modification bit is not set, the corresponding value will not be written. Accordingly, the local processor 40 writes only data values that it has modified and the host processor 50 writes only values it has modified.

In summary, as mentioned above, solid state drives (SSDs) typically use single cell or multi cell NAND flash memory. While it is desirable to execute processing of large amounts of data with SSDs as the primary medium (cheaper price, more space efficient for large capacities, power efficiency) it is currently not feasible to do this (due to access latency, typical burst length of 4 kB and to a degree durability). Also, when parallelizing data processing that require large amounts of storage typically only available in a file based storage or where data persistency is required (such as in the event of computer restart or power failure), it is desirable to be able to partially access files in parallel, including parallel, concurrent accesses into the same file at different offsets (points as seen from the beginning of the file). It is also desirable for each thread to be able to modify data selectively and for concurrent writes (as in bytes written into a file simultaneously) to comply with standardised behaviour (writes can happen in any order, but no "stale data" (out of date cached data) should contaminate the file). However, the process of retrieving from a file system is very processing power intensive, it typically includes a context switch of the currently executing thread, requires a fetch of a full burst of data of a fixed length set by the operating system (typically 4 kB) and additional software operations to ensure the aforementioned standardised behaviour.

The orders of magnitude difference in read and write access latency as well as the difference in natural burst length make it impractical to use SSDs as main memory in computers. A workaround is possible by mapping files into memory, thereby implicitly using RAM to cache the content of the SSD in blocks that fit with the natural burst length of SSD. This workaround has the disadvantage that it requires this caching to be implemented in software thereby heavily drawing on CPU resources.

The file mapping into memory also requires the following additional steps to be taken in software: notice that an access to a specific part of virtual memory (where the file is mapped) has failed (e.g. a 4 kB memory page has missed); look up the physical location of this exemplary 4 kB part of the file within the file allocation structure (which differs depending on the file system); request a read of 4 kB from the storage to the memory; modify this 4 kB page freely and with a single byte granularity while in memory; write back the 4 kB page to the file system; which, in some file systems includes: looking up the physical location again, because in certain file systems parts of files can change location when they are written again; and adjusting the file allocation structure, if required. In one embodiment, the memory unit 10 reports to the host processor 50 at step S155 that a part of a file has been written again so that the host processor 50 can provide a mapping to the aforementioned changed location and adjust the file allocation structure as required.

A CVT processor, such as a general purpose graphics processing unit (GPU), connected to a host processor running the operating system would typically request the host to map files into the host memory space. If the device is capable of accessing the host memory space it would still somehow have to trigger the aforementioned memory page miss that makes the host execute the aforementioned steps to make that part of the file accessible in memory and ensure it is correctly modified and stored back later. This also is very inefficient because it requires all modifications to traverse the host-device bus.

Hence, as described above, some embodiments provide a plurality of flash controllers, typically controllers capable of interfacing with solid state drives, connected to a host-programmable, hardware-implemented file mapping unit operable to map a subset of the files inside the file allocation structure with added modification reporting functionality operable to support multiple file systems (optional: at the same time) connected to a processor (typically a CVT processor) and a typically host processor (either through the processor or directly to the unit) and optionally a cache that can be located in between the processor connection and the file mapping unit, in which case it can benefit from the subset of mapped files as a mechanism to reduce tag size and reduce the load on the file mapping unit (the virtual address cache) or located between the file mapping unit and the plurality of flash controllers (or both). In embodiments, there is provided an interconnect between multiple of these devices. In embodiments, there is the ability to support a modified mask or a write mask (a bit mask) of which bits have been modified when something is written to the cache. In embodiments, the cache line length is configurable (at runtime in hardware through prediction, per file during host programming of the file mapping unit). In embodiments, there is provided the functionality of the file mapping unit in conjunction with a/the cache to buffer all subsequent writes to a file after the initial mapping, thereby effectively freezing the file in the state it was when it was mapped (freeze buffering). In embodiments, a modification report created reports modifications to a mapped file by the local processor to the host processor (including the write mask) so that the host processor can update or invalidate any buffers of said file it may hold (also referred to here as evicting caches).

Also, some embodiments provide a plurality of flash controllers connected to a host-programmable file mapping unit and connected to a processor, typically a CVT processor, and typically connected to a cache (preferably with a configurable length cache), optionally able to store a write mask and typically a connection to the host system (e.g. through PCI Express) and typically some additional cache memory (RAM) and some processor main memory (RAM) and optionally a connection between these systems on different chips, on different circuit boards or in different computers.

A read from a file or from a memory address defined as in file-based, persistent storage executed on the local processor that misses in the caches of the processor will optionally hit in the cache in front of the file mapping unit. If a cache miss occurs then the file mapping unit resolves its virtual memory address to its physical address (the location of this part of the file) in persistent storage by traversing the host-programmed structures pre-stored in the file mapping unit using one of the following: a manipulation (reordering or programmed modification) of the bits in the address; a binary search into a sorted list of locations; traversing a binary tree; processing the address or part of the address with a lookup table; looking up in a hash table or the like.

Optionally a hit may occur in the cache after the file mapping unit. If a cache miss occurs then a burst of a (run-time or per file host-programmable configurable) length of data from one or more of the flash controllers may be retrieved.

In the case of the cache being located before the file mapping unit (the virtual address cache), the cache does not map the physical memory space but a virtual memory space is constructed, for example, by assigning each mapped file a start pointer into this space and then calculating the file's virtual address for each byte as start pointer+offset into the file (typically in bytes). This can also be used to reduce the memory required for tags in a cache (which is very valuable when having the tags of a cache on-chip and therefore memory for storing tags is very limited).

Although illustrative embodiments of the invention have been disclosed in detail herein, with reference to the accompanying drawings, it is understood that the invention is not limited to the precise embodiment and that various changes and modifications can be effected therein by one skilled in the art without departing from the scope of the invention as defined by the appended claims and their equivalents.

Aspects and embodiments of the invention are set out in the following numbered paragraphs. It is to be understood that the invention encompasses these aspects.

Paragraph 1. A memory unit, comprising: at least one controller operable to interface with at least one corresponding persistent memory device operable to store files in accordance with a file system; and a file mapping unit operable, in response to a virtual file access request from processing logic, said virtual file access request having a virtual address within a virtual address space associated with one of said files identifying data to be accessed, to map said virtual address to a physical address of said data within said one of said files using pre-stored mapping information and to issue a physical access request having said physical address to access said data within said one of said files.

Paragraph 2. The memory unit of paragraph 1, wherein said mapping information associates virtual addresses with physical addresses for at least parts of a subset of said files, said subset of files being those which are indicated as being accessible by a program operable to generate said virtual access request.

Paragraph 3. The memory unit of paragraph 1 or 2, wherein said mapping information is pre-stored prior to said virtual access request being received.

Paragraph 4. The memory unit of any preceding paragraph, wherein said file mapping unit is operable to map said virtual address to said physical address by utilising selected bits of said virtual address to generate said physical address in accordance with a mapping function.

Paragraph 5. The memory unit of any preceding paragraph, wherein said file mapping unit is operable to determine, from pre-stored size information associated with said virtual mapping space, an amount of data which includes said data of said physical access request.

Paragraph 6. The memory unit of any preceding paragraph, comprising a physical address cache operable to store said amount of data and wherein a size of a cache line of said physical address cache exceeds said amount of data.

Paragraph 7. The memory unit of any preceding paragraph, wherein, when said access request is a read request, said file mapping unit is operable to provide said data identified by said physical address associated with said physical access request in response to said virtual access request.

Paragraph 8. The memory unit of any preceding paragraph, wherein, when said access request is a write request, said file mapping unit is operable to provide data identified by said virtual address associated with said virtual access request mapped to said physical address associated with said physical access request.

Paragraph 9. The memory unit of any preceding paragraph, wherein, when said access request is said write request, said file mapping unit is operable to identify modified data within said data.

Paragraph 10. The memory unit of any preceding paragraph, comprising a virtual address cache operable to store said data provided by said file mapping unit remapped to said virtual address associated with said virtual access request.

Paragraph 11. The memory unit of any preceding paragraph, wherein said file mapping unit is operable to receive host access requests from a host processor to access data identified by an address which is associated with said at least parts of a subset of said files and to determine an access type associated with said virtual access requests and said host access requests.

Paragraph 12. The memory unit of paragraph 11, wherein said file mapping unit is operable, when both said virtual access requests and said host access requests are read requests, to provide data in response to both said virtual access request and said host virtual access request.

Paragraph 13. The memory unit of paragraph 11 or 12, wherein said file mapping unit is operable, when said host access requests are read requests and said virtual access requests are read/write requests, to provide at least one of: an indication to said host processor that data has been modified in response to said virtual access requests; an indication to said host processor to evict data from its cache that has been modified in response to said virtual access requests; and an indication to said host processor of data that has been modified in response to said virtual access requests.

Paragraph 14. The memory unit of any one of paragraphs 11 to 13, wherein said file mapping unit is operable, when said host access requests are read requests, said virtual access requests are read/write requests and said read/write requests are associated with at least part of a subset of said files identified as requiring host processor data coherency, to provide at least one of: an indication to said host processor when data has been modified in response to said virtual access requests; an indication to said host processor of data when it is modified in response to said virtual access requests; and an indication to said host processor of data that has been modified in response to said virtual access requests when said virtual access requests to said at least part of a subset of said files identified as requiring host processor data coherency have ceased.

Paragraph 15. The memory unit of any one of paragraphs 11 to 14, comprising a modification buffer and wherein said file mapping unit is operable, when said virtual access requests are read requests to at least part of a subset of said files and said host access requests are read/write requests, to store data modified in response to said host access requests in said modification buffer until virtual access requests to said at least part of a subset of said files have ceased.

Paragraph 16. The memory unit of paragraph 15, wherein said file mapping unit is operable to determine whether host access requests relate to data stored by said modification buffer and, if so, to utilise said data stored by said modification buffer in response to said host access requests.

Paragraph 17. The memory unit of paragraph 15 or 16, wherein said modification buffer is operable to write out said data stored by said modification buffer when said virtual access requests to said at least part of a subset of said files have ceased.

Paragraph 18. The memory unit of any one of paragraphs 11 to 17, wherein said file mapping unit is operable, when said host access requests are read/write requests and said virtual access requests are read/write requests, to consolidate data modified in response to said host access requests and said virtual access requests.

Paragraph 19. A method, comprising: in response to a virtual file access request from processing logic, said virtual file access request having a virtual address within a virtual address space identifying data to be accessed, said virtual address being associated with a file stored in accordance with a file system by a persistent memory device, mapping said virtual address to a physical address of said data within said one of said files using pre-stored mapping information and issuing a physical access request having said physical address to access said data within said one of said files.

Paragraph 20. A computer program product operable, when executed on a computer, to perform the method steps of paragraph 19.

The invention claimed is:

1. A memory unit, comprising:
at least one controller operable to interface with at least one corresponding persistent memory device operable to store a plurality of files in accordance with a file system; and
a file mapping unit operable, in response to a virtual file access request from a processor, said virtual file access request having a virtual address within a virtual address space associated with one of said plurality of files identifying data to be accessed, to mapsaid virtual address to a physical address of said data within any one of said plurality of files without generating an exception by concatenating a plurality of bits of said virtual address with one or more bits derived from said virtual address to generate said physical address, and to issue a physical access request having said physical address to access said data within said one of said plurality of files.

2. The memory unit of claim 1, wherein said file mapping unit is operable to determine, from pre-stored size information associated with said virtual mapping space, an amount of data which includes said data of said physical access request.

3. The memory unit of claim 2, comprising a physical address cache operable to store said amount of data and wherein a size of a cache line of said physical address cache exceeds said amount of data.

4. The memory unit of claim 1, wherein, when said access request is a read request, said file mapping unit is operable to provide said data identified by said physical address associated with said physical access request in response to said virtual access request.

5. The memory unit of claim 1, wherein, when said access request is a write request, said file mapping unit is operable to provide data identified by said virtual address associated with said virtual access request mapped to said physical address associated with said physical access request.

6. The memory unit of claim 1, wherein, when said access request is said write request, said file mapping unit is operable to identify modified data within said data.

7. The memory unit of claim 1, comprising a virtual address cache operable to store said data provided by said file mapping unit remapped to said virtual address associated with said virtual access request.

8. The memory unit of claim 1, wherein said file mapping unit is operable to receive host access requests from a host processor to access data identified by an address which is associated with said at least parts of a subset of said files and to determine an access type associated with said virtual access requests and said host access requests.

9. The memory unit of claim 8, wherein said file mapping unit is operable, when both said virtual access requests and said host access requests are read requests, to provide data in response to both said virtual access request and said host virtual access request.

10. The memory unit of claim 8, wherein said file mapping unit is operable, when said host access requests are read requests and said virtual access requests are read/write requests, to provide at least one of:
an indication to said host processor that data has been modified in response to said virtual access requests;
an indication to said host processor to evict data from its cache that has been modified in response to said virtual access requests; and
an indication to said host processor of data that has been modified in response to said virtual access requests.

11. The memory unit of claim 8, wherein said file mapping unit is operable, when said host access requests are read requests, said virtual access requests are read/write requests and said read/write requests are identified as requiring host processor data coherency, to provide at least one of:
- an indication to said host processor when data has been modified in response to said virtual access requests;
- an indication to said host processor of data when it is modified in response to said virtual access requests; and
- an indication to said host processor of data that has been modified in response to said virtual access requests when said virtual access requests identified as requiring host processor data coherency have ceased.

12. The memory unit of claim 8, comprising a modification buffer and wherein said file mapping unit is operable, when said virtual access requests are read requests to at least part of a subset of said files and said host access requests are read/write requests, to store data modified in response to said host access requests in said modification buffer until virtual access requests to said at least part of a subset of said files have ceased.

13. The memory unit of claim 12, wherein said file mapping unit is operable to determine whether host access requests relate to data stored by said modification buffer and, if so, to utilize said data stored by said modification buffer in response to said host access requests.

14. The memory unit of claim 12, wherein said modification buffer is operable to write out said data stored by said modification buffer when said virtual access requests to said at least part of a subset of said files have ceased.

15. The memory unit of claim 8, wherein said file mapping unit is operable, when said host access requests are read/write requests and said virtual access requests are read/write requests, to consolidate data modified in response to said host access requests and said virtual access requests.

16. The memory unit according to claim 1, wherein each of said one or more bits derived from said virtual address are bits copied from said virtual address to said physical address.

17. The memory unit according to claim 1, wherein each of said one or more bits derived from said virtual address are bits taken from said virtual address that are different from said plurality of bits of said virtual address.

18. The memory unit according to claim 1, wherein said one or more bits derived from portions of said virtual address are bits representative of a persistent storage device.

19. A method, comprising:
in response to a virtual file access request from processing logic, said virtual file access request having a virtual address within a virtual address space identifying data to be accessed, said virtual address being associated with a file stored in accordance with a file system by a persistent memory device, mapping said virtual address to a physical address of said data within said file without generating an exception using pre-stored mapping information comprising a mapping function pre-stored within said file mapping unit by concatenating selected bits of said virtual address with at least one bit derived from selected bits of said virtual address to generate said physical address in accordance with said mapping function and issuing a physical access request to said persistent memory device, said physical access request having said physical address to access said data within said one of said files.

20. A memory unit, comprising:
at least one controller operable to interface with at least one corresponding persistent memory device operable to store files in accordance with a file system comprised of a plurality of physical addresses; and
a file mapping unit operable to map a virtual address to each physical address in said file system without generating an exception when requested by a processor to access any one of said physical addresses, said file mapping unit operable in response to a virtual file access request from a processor, said virtual file access request having one of said virtual address within a virtual address space associated with one of said files identifying data to be accessed, to map said virtual address to one of said physical address of said data within one of said files by concatenating a plurality of bits of said virtual address with one or more bits derived from said virtual address to generate said mapped physical address, and to issue a physical access request having said mapped physical address to access said data within said one of said files.

* * * * *